United States Patent

Weinberger

[15] 3,644,906

[45] Feb. 22, 1972

[54] HYBRID ASSOCIATIVE MEMORY

[72] Inventor: Arnold Weinberger, Newburgh, N.Y.

[73] Assignee: International Business Machines Corporation, Armonk, N.Y.

[22] Filed: Dec. 24, 1969

[21] Appl. No.: 887,834

[52] U.S. Cl. ................................ 340/173 AM, 340/174 GA
[51] Int. Cl. ..................................... G11c 15/00, G11c 5/02
[58] Field of Search ............................ 340/173 AM, 174 AM

[56] References Cited

UNITED STATES PATENTS 3,257,646 6/1966 Roth ................................ 340/173 X
3,438,015 4/1969 Koerner ................................ 340/174
3,445,821 5/1969 Rudolph et al. .................... 340/173 X
3,461,440 8/1969 Chang .................................. 340/174
3,548,386 2/1970 Bidwell et al. .................. 340/173 AM

*Primary Examiner*—Stanley M. Urynowicz, Jr.
*Attorney*—Hanifin and Jancin and William S. Robertson

[57] ABSTRACT

A memory is disclosed in which words are located by both associative and nonassociative addressing. The nonassociative portion of the address defines a general category for the word being searched and a corresponding portion of the memory. The associative portion of the address is searched within the addressed portion of the memory without regard to the actual memory location. Conventional nonassociative storage cell arrays are arranged to be addressed as an associative memory of three-state storage cells.

7 Claims, 1 Drawing Figure

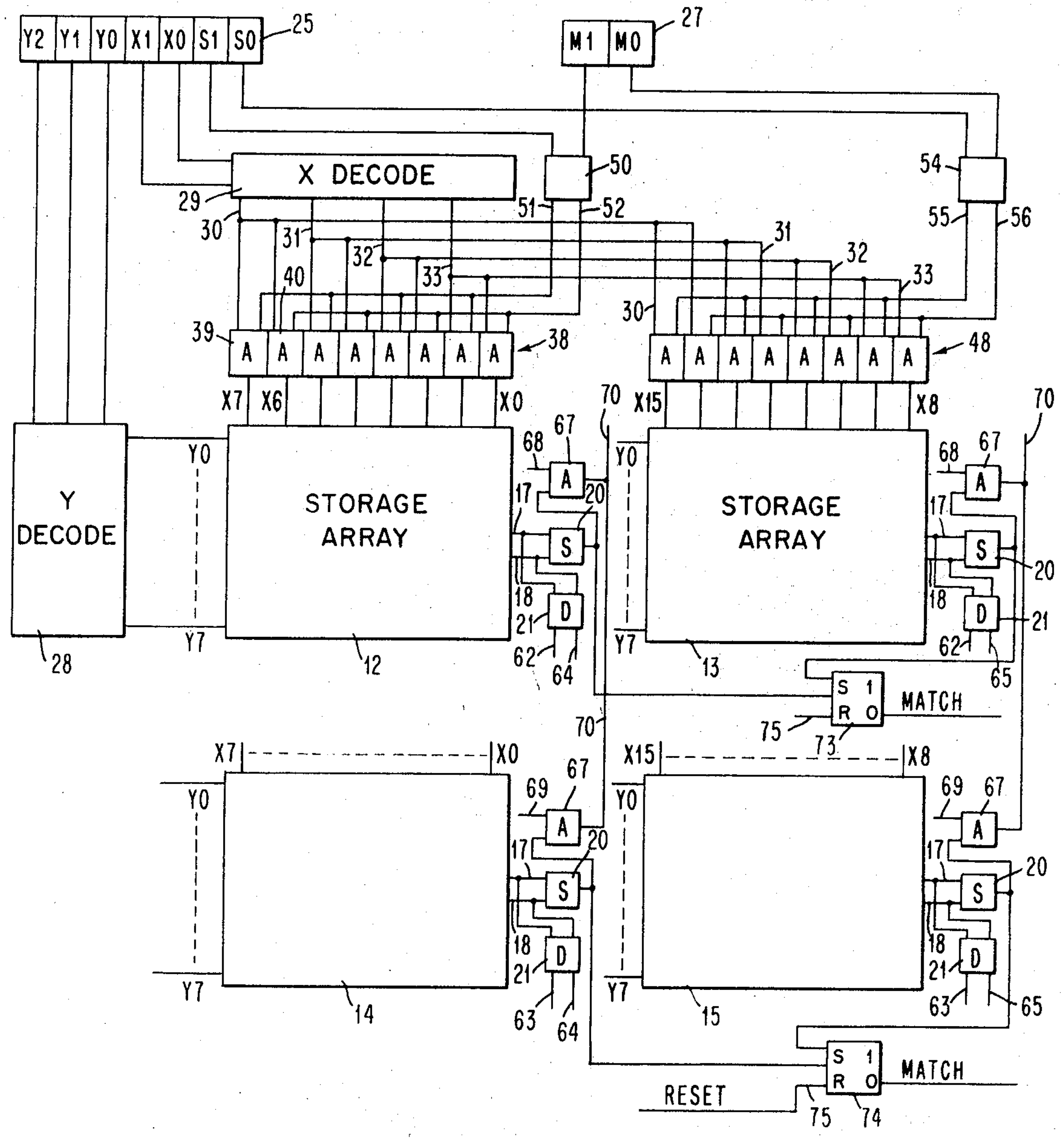
INVENTOR
ARNOLD WEINBERGER
BY W. J. Roberts
ATTORNEY

HYBRID ASSOCIATIVE MEMORY

INTRODUCTION

It will be helpful to review some of the features and terminology of associative and nonassociative memories that particularly apply to this invention. The elemental unit of storage in a memory is called a storage cell. For example, a pair of transistors can be interconnected to form a bistable circuit that stores a 1 or a 0 according to which one of the transistors is turned on. It is convenient to call the transistor that is turned on for storing a 1 the "one" transistor and to call the transistor that is turned on to store a 0 the "zero" transistor. In a write operation the one or the zero transistor is turned on to represent the bit that is to be stored in the cell. In a read operation, the conduction states of the transistors are sensed, for example by sensing the voltage difference between the collector terminals of the transistors. In an associative search operation the cell is read in such a way as to form a comparison with a bit that will be called a search bit. For example, a 0 can be searched by reading the one transistor and interpreting conduction as a mismatch.

In an associative memory a storage cell providing four storage states is particularly useful. These storage cells may be formed of two binary storage circuits and the state of the storage cell can be represented by the individual states of the two binary circuits. Thus, a 10 state of the cell represents a binary 1 and a 01 state of the binary cell represents a 0. Because a search operation is performed by reading any mismatching 1's, a storage cell in the 00 state can not produce a mismatch and this state is called the "don't care" state. Similarly, the 11 storage state is a permanent mismatch.

For a nonassociative memory, several transistor storage cells can be formed in a row and column matrix on a common silicon chip. The cells are interconnected along row and column wires that permit selecting a single cell for a memory operation. Ordinarily a storage cell is conditioned for a memory operation by coincident voltages applied to the corresponding row and column wires. An additional wire called a bit-sense wire is arranged to receive the signal produced during a read operation and to carry a signal that controls which of the transistors is turned on during a write operation. The row and column wires of the storage cell being addressed are defined by an address that is supplied to the memory for a memory operation. Circuits called decoders energize the appropriate row wire and column wire according to their portion of the memory address. This organization of memory cells is called "three-dimensional" because the cells are arrayed in two dimensions on each chip and the chips, which represent different bit positions of a memory word, form a third dimension of addressing.

Associative memories have generally used two dimensional organization. Rows of storage cells represent words of data and the outputs from the cells can be interconnected along the work dimension of the array for detecting a mismatch signal from any cell of the word. The cells are interconnected in the column dimension with the circuitry for a related bit position. Two dimensional organization is disadvantageous because the chip on which the memory is formed must have an external connection for each row and each column of the array. Since the number of connections that can be made to a chip is limited, two dimensional organization does not effectively use the capability of a chip for holding a large number of storage cells. By contrast, in the three-dimensional addressing of nonassociative memories, a few connections to the chip can carry addressing signals that are decoded for selecting one of a large number of storage cells. On object of this invention is to provide a new and improved associative memory in which chips that are arranged for nonassociative addressing are operated associatively.

In the associative memory of this invention, a selected number of chips that each have an array of non-associatively addressable binary storage circuits are arranged in a row and column matrix. Each column represents a bit position of words stored in the memory. Rows provide additional word capacity.

Words stored in the memory are arranged in categories that are identified by a conventional nonassociative address. In an example that will be used later, each category is a table in which a particular logic or arithmetic function can be looked up. The nonassociative part of the address depends on the particular operation that is to be performed and it identifies to set of storage cells in the memory that can be searched associatively to carry out the function.

The memory includes a register called a search register that stores a word that is to be searched for in the memory. Each bit position of the search register is associated with a particular bit position of the memory and with the corresponding column of the matrix of storage arrays. The memory preferably includes also a mask register that holds a word defining bit positions of the memory that are not to be searched.

An array of binary circuits in nonassociatively addressable according to an address having $n$ bits. In the memory of this invention, pairs of binary circuits forming a storage cell are addressed by $n-1$ of the address bits. The remaining address bit is developed to address one or the other of the binary circuits for write, read and associative search operations.

Several logic circuits and memory organizations for using the associative bit will be explained in the following description of the preferred and other embodiments of the invention.

THE DRAWING

The drawing shows the preferred embodiment of the memory of this invention.

THE MEMORY OF THE DRAWING

The memory of the drawing includes four storage arrays 12, 13, 14 and 15 arranged to illustrate a memory with any selected number of arrays. A storage array is preferably 64 transistor bistable circuits arranged in eight rows and eight columns. A storage cell is addressable for a memory operation by coincident voltages applied to one row wire and one column wire. The column or X wires are conventionally identified by letters X0 through X7 and X8 through X15 and the Y wires are identified as Y0 through Y7. Each storage array has a pair of bit-sense wires 17 and 18. A sense amplifier 20 is connected to wires 17 and 18 to receive signals produced by an addressed cell during a read operation or a search operation. A bit driver 21 is connected to wires 17, 18 to produce a signal controlling whether the addressed cell is set in its 1 or 0 state during a write operation. These features of the memory are conventional in nonassociative memories. Components of the circuit that will be described next operate these nonassociative arrays for associative searching and for nonassociative read and write operations.

A word to be searched in the memory is stored in a register 25. The word to be searched is arranged in register 25 with X- and Y-bit positions defining a general category to be searched and with the S-bit positions defining an associative search within this category. (Examples will be discussed later). In mask register 27 each bit position controls whether the corresponding bit position of the memory is to be searched. As is conventional, masking permits searching only a selected portion of each word in the memory.

A decoder 28 is connected to receive bits Y0, Y1 and Y2 of the address and to energize the corresponding one of the eight Y lines, Y0 through Y7. The output of decoder 28 is supplied to each storage array as legends in the drawing indicate.

A decoder 29 is connected to receive the two X bits of register 25 and to produce a signal on one of four decode outputs 30, 31, 32, and 33. A set of logic (AND) circuits 38 gate each of the four outputs of decoder 29 to one or the other of the related pair of the X wires of storage arrays 12 and 14. For example, output 30 is connectable to wire X7 or X6 according to the condition of the associated logic gates 39 and 40.

A similar set of logic circuits 48 is arranged to couple the X decode outputs 30 through 33 to the eight column wires, X8 through X15 of storage arrays 13 and 14.

Thus, the X and Y bits in register 25 define in the corresponding position in each storage array a storage cell made up of two binary storage circuits. As will be explained next, gates 38 and 48 are controlled to select one of the binary circuits in the addressed storage cell for read, write, and search operations.

A logic circuit 50 receives bit S1 from register 25 and bit M1 from mask register 27 and produces outputs 51 and 52. A 1 in mask register 27 signifies that the corresponding bit position of the storage array is masked and that the search operation is not to take place. A 0 in register 27 signifies that the bit position is unmasked and a search is to take place. Output 51 has the logic function $\overline{S1}\,\overline{M1}$ and output 52 has the logic function $S1\overline{M1}$. Thus, when position S1 is masked both outputs 51, 52 have 0 logic values. When bit position S1 is unmasked, output 52 has the value of bit position S1 and output 51 has the complement value.

Similarly, a logic circuit 54 is connected to receive bits S0 and M0 and to produce the function $\overline{S0}\,\overline{M0}$ at an output 55 and the function $S0\overline{M0}$ at an output 56. Outputs 55, 56 are connected to control gates 48 in the way already described for logic circuit 50 and gates 38.

Other components of the memory will be introduced as they appear in the following descriptions of write, read, and search operations.

THE WRITE OPERATION

For a write operation the memory is addressed nonassociatively according to the X and Y portion of the address in register 25. The write operation takes two memory cycles, one to write in one binary circuit of the addressed storage cell and a second operation to write in the other binary circuit of the addressed cell. The S portion of register 25 may be loaded with all 1's and with all 0's on the two parts of the write operation and register 27 may be loaded with 0's or gates 38 and 48 are otherwise controlled to individually select the two binary circuits of the addressed cell. The addressed word is additionally defined as to its location in arrays 12 and 13 or arrays 14 and 15. The drivers of arrays 12 and 13 are enabled for a write operation by a common selection line 62 and the drivers of arrays 14 and 15 are similarly enabled by a common line 63. (Interconnections between lines 62 and between lines 63 are not shown in the drawing). The drivers of bit position 1 are controlled by a common line 64 to write a 1 or a 0 and the drivers of bit position 0 are similarly interconnected to a common line 65 to control a write operation. For example, in a two part write operation on a word in arrays 12 and 13, bit positions S1 and S0 are each given a 1 to select the storage cells associated with lines 52 and 56. Lines 64 and 65 are individually energized according to the data to be written, and lines 62 are controlled to enable the corresponding drivers. Storage cells in arrays 14 and 15 are also conditioned for a write operation.

During the operation described, the storage cells in arrays 14 and 15 are also enabled by their X and Y wires for a write operation. Common line 63 of the associated drivers is controlled either to prevent a write operation in arrays 14 and 15 or to allow either arrays to go through the write operation just described for arrays 12 and 13.

The S bit positions of register 25 are then loaded with zeros to begin the next part of the write operation. Thus, each binary circuit of the addressed cell can be set to either of its states and each cell can be set to any one of its four possible states. That is, each cell of a pair can be set to either 1 or 0 so that a pair of cells can be set to 10 for a binary 1, 01 for a binary 0, 00 for a "don't care" and 11 for a permanent mismatch condition.

THE READ OPERATION

For a read operation, the X and Y portion of register 25 is loaded with the address of the storage cells to be read and the S portion of register 25 is loaded with zeros to read the leftmost binary storage circuit of an addressed pair (or with ones to read the other binary storage circuit of the addressed pair). In response to these signals the addressed storage cell in each array produces a signal on lines 17 and 18 at the input of its sense amplifier 20. Gates 67 are provided for selecting the array which is to be read. Each gate 67 receives one input from the associated sense amplifier. Gates 67 of arrays 12 and 13 receive a common controlling signal 68 and gates of arrays 14 and 15 receive a common controlling signal 69. The gates of a common bit position have a common output line 70 that carries the signal on the selected arrays during a read operation.

For reading an addressed word of the memory, the selected control lines 68 or 69 is energized. If more than one line 68, 69 is energized for read operations, the OR-logic function of the two addressed words appears on the lines 70.

THE SEARCH OPERATION

For a search operation, the word in register 25 is arranged so that the X and Y portions of the word defined a general category and the S bits define items to be searched associatively within the addressed category. For example, when tables of logic and arithmetic functions are stored in the memory, the X and Y portion of the word in register 25 defines a particular kind of operation that is to take place, such as addition, and the corresponding storage cells that hold the table for this function. The S bits of register 25 are logical inputs to the table for the operation. This operation can be understood from a different standpoint by considering that in a fully associative array holding logic tables, each word contains a table portion and also a tag that identifies the logic function performed by the table. A search word has a portion corresponding to the X and Y bits in register 25 that permits matches to occur only in the portion of the array where the tag corresponds to the addressed logic function. Similarly, in a table lookup operation in a random access memory, a portion of the address locates the appropriate table and another portion of the address carries the logic input to the table.

Each sense amplifier 20 of arrays 12 and 13 is connected to set a latch 73. Latch 73 has its set input arranged as an OR-logic function that maintains the isolation between the separate read lines 70. Each sense amplifier 20 of arrays 14 and 15 is similarly connected to set a latch 74. Latches 73 and 74 have their reset inputs connected to a common reset line 75 to reset the latches at the beginning of the search operation.

When bit position S1 in register 25 holds a 1, the addressed storage cells in arrays 12 and 14 are to be searched for a matching 10 or a don't care 00. For example, when output 30 of decode circuit 29 is energized, a 1 in the bit position S1 of register 25 produces a signal on line 52 (as already explained) to turn on gate 40 and thereby energize line X6 but not the line X7. If the addressed binary storage device is in its 1 storing state (corresponding to a 01 binary 0 or a 11 permanent mismatch) a signal representing the stored 1 will be produced at the output of sense amplifier 20 to be recorded in latch 73 or 75 as a mismatch. Conversely, if the addressed binary storage device is in its 0 storing state (corresponding to a 10 binary 1 matching the 1 in position S1 of register 25 or a 00 don't care) the 0 voltage output produced by the sense amplifier does not set the latch. When a 0 is stored in bit position S1, arrays 12 and 14 are to be searched for a matching 01 or a don't care 00. An 11 in an addressed storage cell is a mismatch (unless the corresponding position of mask register 27 is set to a one to mask this bit position).

OTHER EMBODIMENTS

Application Ser. No. 744,718 of A. W. Bidwell and A. Weinberger, now U.S. Pat. 3,548,386, assigned to the assignee of this invention, discloses a memory having both associative and nonassociative addressing and discloses more specifically the preferred binary storage circuit of this invention. Other suitable binary storage circuits are well known.

The array may have only storage circuits or it may also include the X and Y address decoders. Where the decoders are on the array chip, one address bit that is applied to the array is developed from the corresponding S bit of the search word. The M bit is applied through conventional timing circuits or other available means to selectively inhibit or permit a nonassociative read operation. The relationship between these two embodiments can be better understood by recognizing that the two-bit X decoder 29, the logic blocks 50, 54 and gates 38, 48 constitute for each memory bit position a three-bit decoder that is gated according to the M bit.

So far in this description, the advantage of using standard nonassociative arrays has been stressed. In fact, the hybrid organization has a significant advantage over a fully associative memory in reducing the number of connections that must be made to a chip for an array of any particular size. Furthermore, most data can be arranged in hybrid form and the performance of a hybrid memory can substantially equal the performance of a fully associative memory. Thus, the hybrid organization is useful with specifically designed arrays as well as with arrays designed for nonassociative use.

The X and Y bits of the address may also be developed associatively or partly associatively. For example, a specific nonassociative address may contain a set of data addresses that are to be searched associatively and the result of the search used in a next search in the nonassociative way already described.

The disclosure of A. Weinberger in the IBM Technical Disclosure Bulletin, May 1969, page 1,744, suggests several applications for hybrid addressing. Other examples will be apparent.

From this description of a specific embodiment of the invention, those skilled in the art will recognize structural variations and applications within the spirit of the invention and the scope of the claims.

What is claimed is:

1. An associative memory comprising, a plurality of arrays of binary storage circuits each addressable nonassociatively by an address of $n$ bits, each array representing a predetermined bit position of the memory, first means providing an address of $n-1$ bits that represent a predetermined data category in which a search is to take place and define in a corresponding position of each array a storage cell formed of two binary storage circuits, second means providing for each memory bit position an additional bit for associative addressing, and third means responsive to said $n-1$ bits and to the additional bit for each bit position to address a selected one of said binary circuits of each cell for a search operation, and fourth means interconnecting said arrays for detecting match and mismatch conditions of addressed words during a search.

2. The associative memory of claim 1 including a mask register and wherein said third means includes means responsive to said mask register to inhibit a search operation on the corresponding array.

3. The associative memory of claim 2 wherein said third means comprises, a first decoder and a second decoder common to all said arrays and connected to decode said $n-1$ bits provided by said first means, means connecting the outputs of said first decoder to corresponding points on each said array, means for each array responsive to said second means and to said mask register for gating said output of said second decoder to one or the other of a pair of binary storage circuits defined by said $n-1$ bits.

4. The associative memory of claim 3 wherein said first and second means comprise a common register connected to receive a word to be searched in the memory.

5. The associative memory of claim 2 in which said third means includes an $n$-bit decoder formed integrally with the associated array.

6. The associative memory of claim 5 including pluralities of arrays for each bit position and a plurality of fourth means for groups of arrays forming a data word.

7. A method of associatively operating a plurality of nonassociative arrays of binary storage elements, each array having an individual address decoder for an address of $n$ bits and representing a predetermined bit position in a memory word, comprising, supplying to each said decoder $n-1$ common address bits defining in each said array a storage cell made up of two binary storage elements and defining a data category to be searched within the memory, forming a predetermined additional address bit individual to each bit position from a corresponding bit of a search word, and supplying said additional bits to said decoders with said common address bits.

* * * * *